(12) United States Patent
Schuster et al.

(10) Patent No.: US 11,274,629 B2
(45) Date of Patent: Mar. 15, 2022

(54) SYSTEM AND METHOD FOR ENERGY RECOVERY IN INDUSTRIAL FACILIIIES

(71) Applicant: ORCAN ENERGY AG, Munich (DE)

(72) Inventors: Andreas Schuster, Tussenhausen (DE); Andreas Sichert, Laufen (DE)

(73) Assignee: Orean Energy AG, Munich (DE)

( * ) Notice: Subject to any disclaimer, the term of this patent is extended or adjusted under 35 U.S.C. 154(b) by 217 days.

(21) Appl. No.: 16/467,012

(22) PCT Filed: Nov. 13, 2017

(86) PCT No.: PCT/EP2017/078996
§ 371 (c)(1),
(2) Date: Jun. 5, 2019

(87) PCT Pub. No.: WO2018/104002
PCT Pub. Date: Jun. 14, 2018

(65) Prior Publication Data
US 2019/0301398 A1   Oct. 3, 2019

(30) Foreign Application Priority Data

Dec. 5, 2016 (EP) ..................... 16202101

(51) Int. Cl.
*F02G 5/04* (2006.01)
*F01K 23/06* (2006.01)
(Continued)

(52) U.S. Cl.
CPC ............. *F02G 5/04* (2013.01); *F01K 23/06* (2013.01); *F01K 23/064* (2013.01); *F01K 25/02* (2013.01); *F01N 5/025* (2013.01); *F02B 39/04* (2013.01)

(58) Field of Classification Search
CPC . F02G 5/04; F01K 25/02; F01K 23/06; F01K 23/064; F01N 5/025; F02B 39/04; Y02T 10/12
(Continued)

(56) References Cited

U.S. PATENT DOCUMENTS 6,301,890 B1 *  10/2001  Zeretzke ................. F02B 37/00
                                                    60/616
2003/0074900 A1 *  4/2003  McFarland ............... F02C 1/10
                                                    60/670
(Continued)

FOREIGN PATENT DOCUMENTS

CN     103983036 A     8/2014
CN     104385915 A     3/2015
(Continued)

OTHER PUBLICATIONS

International Search Report for International Patent Application No. PCT/EP2017/078996 dated Dec. 21, 2017 (English language translation attached).
(Continued)

*Primary Examiner* — Hoang M Nguyen
(74) *Attorney, Agent, or Firm* — Moore & Van Allen PLLC; Henry B. Ward, III

(57) ABSTRACT

The invention refers to a system for energy recovery within an arrangement of industrial components. The system comprises a heat source for the arrangement; a thermodynamic circuit processing device, particularly an ORC device, having a heat exchanger for transferring heat from the heat source to a working medium of the thermodynamic circuit processing device and having an expansion device for expanding the working medium and for generating mechanical or electrical power; and at least one component of the arrangement to be driven, particularly at least one hydraulic or pneumatic machine, which can be driven with the power
(Continued)

generated. The invention further refers to a corresponding method for energy recovery within an arrangement of industrial components.

10 Claims, 2 Drawing Sheets

(51) Int. Cl.
 *F01N 5/02* (2006.01)
 *F02B 39/04* (2006.01)
 *F01K 25/02* (2006.01)
(58) Field of Classification Search
 USPC .................................................. 60/670–680
 See application file for complete search history.

(56) References Cited

U.S. PATENT DOCUMENTS

| | | | |
|---|---|---|---|
| 2004/0244388 A1* | 12/2004 | Watson | F01B 17/02 62/135 |
| 2012/0042653 A1* | 2/2012 | McGuinness | F01K 23/06 60/647 |
| 2015/0292398 A1 | 10/2015 | Ambrosius et al. | |
| 2016/0258659 A1* | 9/2016 | Wang | F25B 27/02 |

FOREIGN PATENT DOCUMENTS

| | | |
|---|---|---|
| CN | 105051329 A | 11/2015 |
| DE | 102010047520 A1 | 4/2012 |
| DE | 102011008027 A1 | 7/2012 |
| DE | 102012019967 A1 | 4/2014 |
| JP | 2009274513 A | 8/2011 |
| WO | 2011089997 A | 7/2011 |

OTHER PUBLICATIONS

Written Opinion for International Patent Application No. PCT/EP2017/078996 dated Dec. 21, 2017.
First Office Action issued by the Chinese Patent Office for Chinese Patent Application No. 201780074782.5, dated Feb. 4, 2021.
Search Report issued by the Chinese Patent Office for Chinese Patent Application No. 201780074782.5, dated Jan. 27, 2021.
Examination Report issued by the Indian Patent Office for Indian Patent Application No. 201947026174, dated Mar. 10, 2021.
Second Office Action issued by the Chinese Patent Office for Chinese Patent Application No. 201780074782.5, dated Aug. 11, 2021.

* cited by examiner

SYSTEM AND METHOD FOR ENERGY RECOVERY IN INDUSTRIAL FACILITIES

FIELD OF THE INVENTION

The invention refers to a system with at least one heat source and a thermodynamic circuit processing device and a method for energy recovery in such a system.

STATE OF THE ART

Waste heat generated in industrial facilities can be used in a thermodynamic circuit processing device to heat a working medium and then relax it in an expansion machine. Electrical power can be generated via a generator coupled to the shaft of the expansion machine. The Organic Rankine Cycle (ORC) process is well suited for this.

This results in the following problem. Due to the low electricity procurement costs, the EEG levy due on the generated own electricity as well as high costs for the connection of an electricity feed-in plant with a feed-in point in the industrial environment, the attractiveness of feeding generated electricity into the grid against payment is low. Calibrated meters shall be provided for the billing of electricity generated and fed into the grid. These are expensive, the accounting and the administrative effort are high.

DESCRIPTION OF THE INVENTION

The object of the invention is to at least partially overcome these disadvantages and to use the waste heat converted into another form of energy within the industrial facility.

This object is solved by a system according to claim 1.

The system for energy recovery within an arrangement of industrial components according to the invention comprises a heat source of the industrial plant; a thermodynamic circuit processing device, particularly an ORC device, having a heat exchanger for transferring heat from the heat source to a working medium of the thermodynamic circuit processing device and having an expansion device for expanding the working medium and for generating mechanical or electrical power; and at least one component of the arrangement to be driven, particularly at least one hydraulic or pneumatic machine, which can be driven by the power generated. The drive of at least one component of the arrangement with the power generated can be directly mechanical or indirectly electrical. The rotary motion of the expansion device first provides mechanical/kinetic energy that can be used directly, or electrical power can be provided by a generator coupled to the expansion device.

The advantage of the system according to the invention is that it is more economical to use the energy generated from waste heat within the industrial facility (e.g. an energy centre of a company) and not to feed it permanently into the power grid. The energy recovered by the ORC system can be used directly for electrical consumers, mechanically coupled (e.g. pumps, drives) or converted into other forms of energy (hydraulic energy, compressed air). This means that components or individual functions of components can be saved.

The system according to the invention can be further developed in such a way that the at least one component to be driven can comprise an air compressor, a hydraulic pump or a water pump which can be directly mechanically driven by a mechanical coupling to the expansion machine.

Another embodiment consists in the fact that an electrical generator can be provided for the generation of electrical power which can be driven by the mechanical power of the expansion device, wherein the at least one component to be driven comprises an electrical motor which can be driven by the electrical power.

This can be further developed to the effect that the electric motor can be an electric drive motor for an air compressor, an electric drive motor for a hydraulic pump, an electric drive motor for a water pump or an electric drive motor for a fan.

According to another embodiment, an electric motor/generator unit may be provided between the expansion device and at least one component to be driven.

This can be further developed in such a way that a first coupling can be provided between the expansion device and the electric motor/generator unit and/or a second coupling can be provided between the electric motor/generator unit and the at least one component to be driven.

Another embodiment consists in the fact that a coupling of the generator and the electric motor or the electric motor/generator unit to a power grid can be provided.

According to another embodiment, an energy storage device may also be provided to receive electrical power from the generator or electric motor/generator unit and to deliver electrical power to the electric motor or electric motor/generator unit.

Another embodiment consists in the fact that the thermodynamic circuit processing device can comprise a further heat exchanger in relation to the flow direction of the working medium upstream of the heat exchanger, whereby waste heat from the compressor device can be transferred to the working medium in the further heat exchanger to preheat the working medium.

The above object is also solved by a method according to claim 10.

The method of energy recovery within an arrangement of industrial components according to the invention comprises the steps: transferring heat from a heat source to a working medium of a thermodynamic circuit processing device in a heat exchanger; expanding the working medium and generating mechanical or electrical power with an expansion device of the thermodynamic circuit processing device; and driving at least one component of the arrangement with the generated energy, in particular a hydraulic or pneumatic machine.

The method according to the invention can be further developed in such a way that a generation of electrical power with a generator coupled to the expansion device is provided.

On the other hand, the method according to the invention can be further developed in such a way that an electric motor/generator unit can be provided between the expansion device and at least one component.

This can be further developed so that the method further comprises the following steps: feeding electrical power from the electric motor/generator unit into a power grid or into a system-internal energy storage; and/or feeding electrical power from the power grid or from the system-internal energy storage to the electric motor/generator unit.

Another further development consists in that a first coupling may be provided between the expansion device and the electric motor/generator unit and/or a second coupling may be provided between the electric motor/generator unit and the at least one component, the method comprising the further steps: connecting or disconnecting the expansion device and the electric motor/generator unit to the first coupling; and/or connecting or disconnecting the electric motor/generator unit and the at least one component to the second coupling. The first and/or second coupling may have a direction dependent or speed dependent freewheel.

According to another embodiment, the thermodynamic circuit processing device may include another heat exchanger upstream of the heat exchanger in relation to the direction of flow of the working medium, and the method may comprise the further step: Transfer of waste heat from the compressor device to the working medium in the further heat exchanger for preheating the working medium.

The embodiments mentioned can be used individually or combined as claimed.

Further features and exemplary embodiments as well as advantages of the present invention are explained in more detail below using the drawings. It goes without saying that the embodiments do not exhaust the scope of this invention. It also goes without saying that some or all of the features described below can be combined in other ways.

DRAWINGS

EMBODIMENTS

Figure 1:
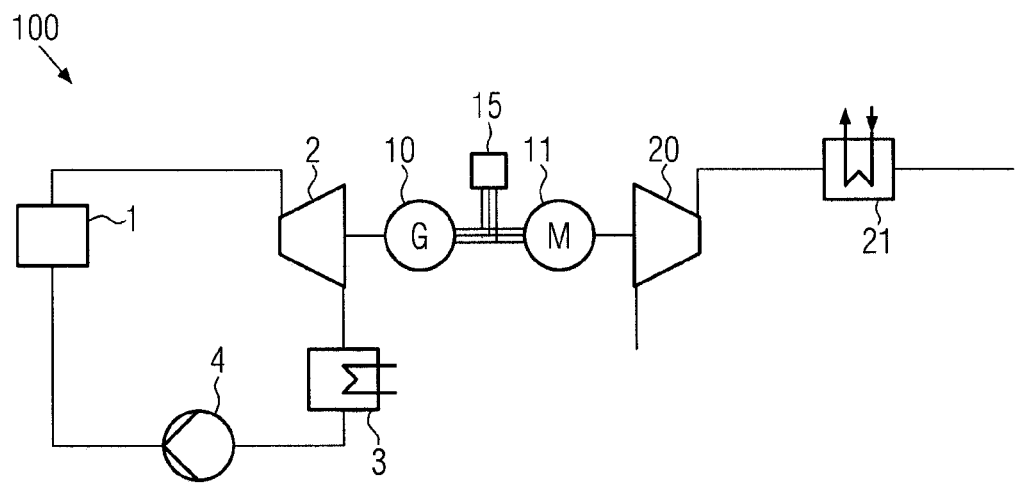
FIG. 1 shows a first embodiment of the system according to the invention.

FIG. 1 shows a first embodiment 100 of the system according to the invention.

An Organic Rankine Cycle (ORC) device with a working medium is used to use waste heat in an industrial facility, i.e. to convert the waste heat into mechanical or electrical power. Usable heat sources are e.g. exhaust gas, oil, cooling water, and compression heat in the compressor (e.g. the compressor cooler can be substituted or relieved). The ORC device comprises a heat exchanger/evaporator 1, an expansion machine 2 (expansion device), a condenser 3 and a feed pump 4. A generator 10 for generating electrical power is arranged on a shaft of the expansion machine 2. The waste heat to be used is fed to the working medium via the heat exchanger 1. The working medium is thereby evaporated and expanded in expansion machine 2 and converted into kinetic energy of expansion machine 2. The working medium is liquefied again in condenser 3. The electrical power generated by generator 10 is used here to drive an electric motor 11 of a compressor 20. Waste heat is dissipated from the compressor circuit via a compressor cooler 21.

The generator 10 and the motor 11 can be connected to an energy storage device, e.g. a rechargeable battery 15, in order to store excess energy from the generator 10 and to supply electrical power to the motor 11 in case of increased energy demand. Alternatively or additionally, a load or heating resistor can be provided if no electrical power can be dissipated by the component to be driven. Alternatively or additionally, a connection to the power grid can also be provided via which electrical power is fed for a short period of time until the electrical power can be taken up again by the component to be driven. Such a short-term feed-in is generally not bound to grid specifications.

Figure 2:
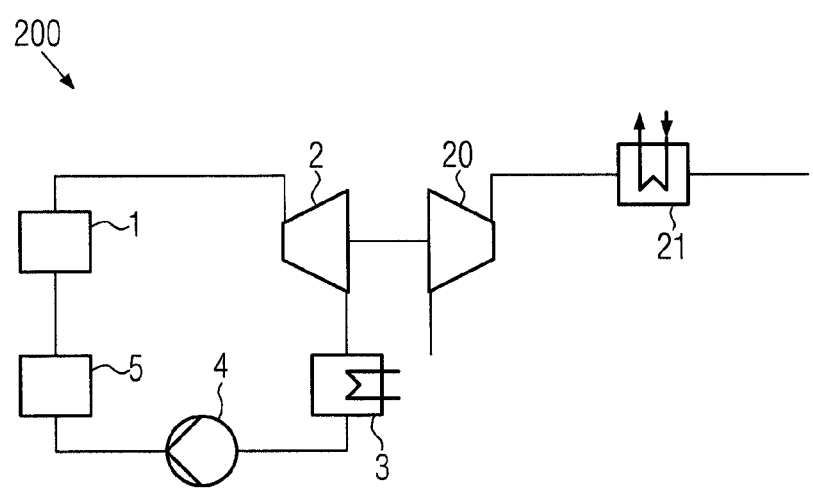
FIG. 2 shows a second embodiment of the system according to the invention.

FIG. 2 shows a second embodiment 200 of the system according to the invention.

Compared to FIG. 1, here and in the following Figures the same reference numerals mean the same elements.

In contrast to the embodiment according to FIG. 1, there is a mechanical coupling between the expansion machine 2 and the compressor 20, so that the compressor 20 is driven directly/directly with the kinetic energy of the expansion machine 2. Either the compressor 20 is directly connected to a shaft of the expansion machine 2 or there is a gear in between to adjust the rotation speed. Furthermore, in this embodiment 200, an additional heat exchanger 5 between feed pump 4 and heat exchanger 1 is provided in the ORC device for preheating the working medium. In this additional heat exchanger 5, waste heat from the compressor circuit or another low-temperature heat source is fed to the ORC working medium via the cooler/compressor heat exchanger 21.

Figure 3:
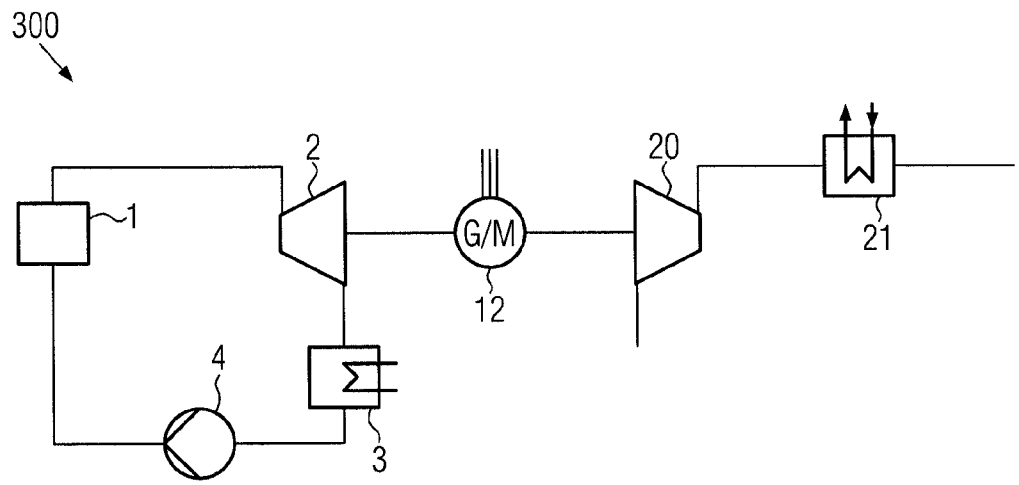
FIG. 3 shows a third embodiment of the system according to the invention.

FIG. 3 shows a third embodiment 300 of the system according to the invention.

Here an electric motor/generator unit 12 (asynchronous motor) is provided instead of generator 10 and motor 11 or instead of the mechanical coupling between expansion device 2 and compressor 20.

With the combination of ORC and e.g. a compressor 20 it can happen that either compressed air is requested, but the ORC cannot provide any or sufficient power, because e.g. no or insufficient heat is available. Here, the asynchronous motor 12 mounted on the shaft between expansion machine 2 and compressor 20 can drive the compressor 20. It may also be the case that the compressor 20 cannot absorb all or none of the power of the compressor 20, but power is available from the ORC. Here, the asynchronous motor 12 can then act as a generator and thus feed excess energy (if permissible) into the power grid. This can be realized without power electronics.

Figure 4:
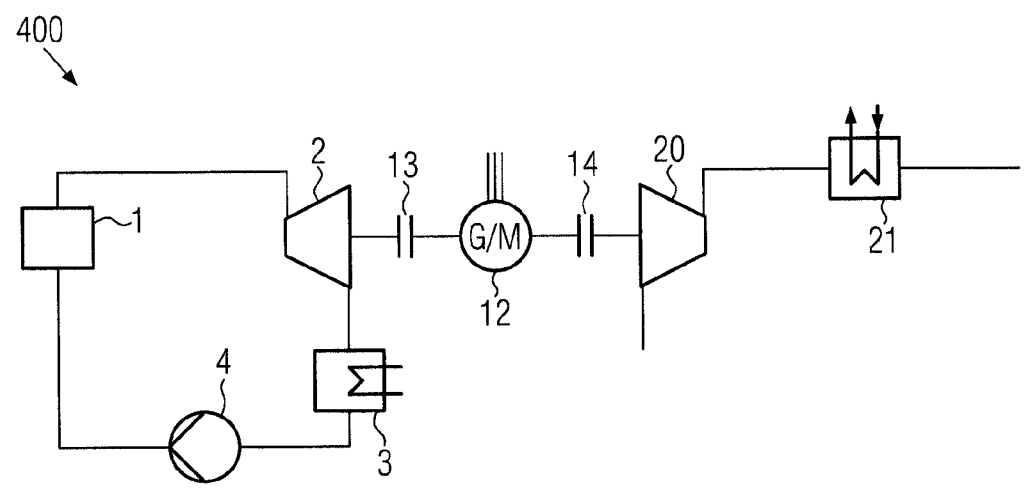
FIG. 4 shows a fourth embodiment of the system according to the invention.

FIG. 4 shows a fourth embodiment 400 of the system according to the invention.

In contrast to the third embodiment, a coupling 13 is provided between the expansion machine 2 and the asynchronous motor 12. Alternatively or additionally a coupling 14 is provided between the asynchronous motor 12 and the compressor 20.

The couplings can be used to separate the expansion machine 2 of the ORC from the asynchronous motor 12 and the compressor 20. This can be useful if there is no or insufficient heat available for the ORC drive. Then it could be the case that the asynchronous motor 12 drives the expansion machine 2 and consumes this power, which is energetically unfavourable. The coupling 13, 14 can be designed to be shiftable, e.g. magnetic, or it can be a freewheel coupling, so that the expansion machine 2 can rotate more slowly relative to the asynchronous motor 12 and the compressor 20, but above all it cannot be in coupled motion, i.e. driven. The coupling 14 between asynchronous motor 12 and compressor 20 can, if no compressed air is required, disconnect the connection to the asynchronous motor 12 acting as generator and thus reduce or completely avoid the power loss generated by compressor 20. This coupling 14 can also be designed to be shiftable, a freewheel cannot be used here.

It may be necessary to ensure that no electrical power is permanently fed into the grid. A short-term energy feedback similar to that of an elevator, escalator or crane could be permissible. If the allowable time span of the feedback is defined and no hydraulic, pneumatic or other energy can be absorbed by the surrounding system, then the excess energy must be reduced. The following possibilities exist for this:

Reduction of the supplied heat, e.g. via a bypass of the heat exchanger/evaporator 1.

Reduction of the energy converted in the ORC by increasing the condensation parameters. This reduces the efficiency and the performance of the ORC, and less heat is absorbed by the condensate, which is then heated to a higher temperature.

Reduction of the energy converted in the ORC by partial or complete bypassing of expansion machine 2 and/or evaporator 1. If evaporator 1 is bypassed, overheating of evaporator 1 must otherwise be prevented.

Supply of too much generated electrical power to a load resistor, which can be placed e.g. in the hot water circuit of the ORC, or which can re-cool in air.

The advantages of the invention are that compressed air and hot water are easily transportable "energy carriers". Compressed air can be stored in the compressed air network or in compressed air accumulators and thus compensate for differences between generation and consumption. Components are saved. For example, the fluid cooler of a compressor can be substituted/reduced, but at least its own consumption is reduced. Otherwise, the feed line, meter and billing of the fed-in electrical power are saved. At some locations it can be difficult/uneconomical to feed the recovered energy into the grid, e.g. because the corresponding infrastructure is not available. With the invention, there is no longer any need for potentially costly grid feed-in (with accompanying quality assurance of the fed-in electricity).

The embodiments shown are only exemplary and the complete scope of the present invention is defined by the claims.

The invention claimed is:

1. A system for energy recovery within an arrangement of industrial components comprising:
    a heat source for the arrangement;
    a thermodynamic circuit processing device having a heat exchanger for transferring heat from the heat source to a working medium of the thermodynamic circuit processing device and having an expansion device for expanding the working medium and for generating mechanical or electrical power; and
    at least one component of the arrangement to be driven wherein the at least one component comprises a hydraulic machine or a pneumatic machine, each of which can be driven by the power generated,
    wherein an electric motor/generator unit is provided between the expansion device and the at least one component to be driven by electrical energy generated by the electric motor/generator unit,
    wherein the electric motor/generator unit is configured for connection to a power grid, and
    wherein the system is configured to feed excess energy from the electric motor/generator unit into the power grid for a limited period of time when the generated electrical energy is not used for driving the at least one component,
    wherein limiting the period of time of feeding excess energy into the power grid is accomplished by the system being adapted to perform, after an allowable time span has elapsed, at least one selected from the group comprising:
    (i) reduction of converted energy by increasing the condensation temperature; and
    (ii) reduction of converted energy by partial or complete bypassing of at least one selected from the group consisting of the expansion device and the heat exchanger.

2. The system according to claim 1, wherein the at least one component to be driven comprises a compressor device comprising an air compressor, or a hydraulic pump or a water pump, which can be directly mechanically driven by a mechanical coupling to the expansion machine.

3. The system according to claim 1, wherein the system further comprises at least one selected from the group comprising (i) a first coupling is provided between the expansion device and the electric motor/generator unit and (ii) a second coupling is provided between the electric motor/generator unit and the at least one component to be driven.

4. The system according to claim 1, wherein there is provided an energy storage for receiving electrical power from the electric motor/generator unit and for delivering electrical power to the electric motor/generator unit, or wherein there is provided a load resistor for receiving electrical power from the electric motor/generator unit.

5. The system according to claim 2, wherein the thermodynamic circuit processing device comprises a further heat exchanger, with respect to the flow direction of the working medium upstream of the heat exchanger, and wherein low-temperature heat or waste heat from the compressor device in the further heat exchanger is transferred to the working medium for preheating the working medium.

6. A method of recovering energy within an arrangement of industrial components comprising the steps of:
    transferring heat from a heat source to a working medium of a thermodynamic circuit processing device in a heat exchanger;
    expanding the working medium and generating mechanical or electrical power with an expansion device of the thermodynamic cycle process device;
    driving at least one component of the arrangement with the power generated, wherein the at least one component comprises a hydraulic machine or a pneumatic machine;
    providing an electric motor/generator unit between the expansion device and that at least one component; and
    temporally limited feeding of excess electrical energy from the electric motor/generator unit into a power grid,
    wherein a temporal limitation of feeding of excess electrical energy from the electric motor/generator unit into a power grid is performed by, at least one selected from the group comprising:
    (i) reducing converted energy by increasing the condensation temperature; and
    (ii) reducing the converted energy by partial or complete bypassing of at least one selected from the group consisting of the expansion device and the heat exchanger.

7. The method according to claim 6, wherein the method further comprises at least one selected from the group comprising:
    feeding electrical power from the electric motor/generator unit into a system-internal energy storage; and
    supplying electrical power from the power grid or from the system's internal energy storage to the electric motor/generator unit.

8. The method according to claim 6, further comprising:
    (A) at least one selected from the group comprising (i) a first coupling is provided between the expansion device and the electric motor/generator unit and (ii) a second coupling is provided between the electric motor/generator unit and the at least one component;

(B) at least one selected from the group comprising (i) connecting or disconnecting the expansion device and the electric motor/generator unit to the first coupling and (ii) connecting or disconnecting the electric motor/generator unit and the at least one component to the second coupling; and (C) wherein at least one selected from the group comprising the first coupling and the second coupling have a freewheel that depends on rotation direction or rotation speed.

9. The method according to claim 6, wherein the thermodynamic circuit processing device comprises a further heat exchanger upstream of the heat exchanger with respect to the flow direction of the working medium, and wherein the method comprises the further step:

transferring waste heat from the compressor device to the working medium in the further heat exchanger for preheating the working medium.

10. The system according to claim 2, wherein limiting the period of time of feeding excess energy into the power grid is accomplished by the system being adapted to perform, after an allowable time span has elapsed, at least one selected from the group comprising:

reduction of heat supplied to the heat exchanger;

reduction of converted energy by increasing the condensation temperature;

reduction of converted energy by partial or complete bypassing of the expansion device and/or the heat exchanger; and supply of an excess amount of generated electrical power to a load resistor.

* * * * *

UNITED STATES PATENT AND TRADEMARK OFFICE
CERTIFICATE OF CORRECTION

PATENT NO. : 11,274,629 B2
APPLICATION NO. : 16/467012
DATED : March 15, 2022
INVENTOR(S) : Andreas Schuster and Andreas Sichert It is certified that error appears in the above-identified patent and that said Letters Patent is hereby corrected as shown below:

On the Title Page

Item (73) (Assignee), "Orean Energy AG" is changed to "Orcan Energy AG".

Signed and Sealed this
First Day of October, 2024

Katherine Kelly Vidal
Director of the United States Patent and Trademark Office